(12) United States Patent
Inoue et al.

(10) Patent No.: US 7,272,825 B2
(45) Date of Patent: *Sep. 18, 2007

(54) DEVELOPMENT AID DEVICE

(75) Inventors: Makoto Inoue, Ritto (JP); Ken Tsutsui, Yokohama (JP); Takashi Miyake, Sagamihara (JP)

(73) Assignee: OMRON Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/475,521

(22) Filed: Jun. 26, 2006

(65) Prior Publication Data

US 2006/0247806 A1    Nov. 2, 2006

Related U.S. Application Data

(63) Continuation-in-part of application No. 11/094,090, filed on Mar. 29, 2005.

(30) Foreign Application Priority Data

Mar. 31, 2004    (JP)    ............................ P2004-108358

(51) Int. Cl.
*G06F 9/44* (2006.01)
*G06F 3/48* (2006.01)
*G05B 11/01* (2006.01)

(52) U.S. Cl. ...................... 717/126; 717/125; 715/764; 715/970; 700/17; 700/23

(58) Field of Classification Search .................. 700/7, 700/12, 17, 18, 23, 26, 83, 86; 717/114, 717/124–127; 715/700, 764, 970; 714/38, 714/46

See application file for complete search history.

(56) References Cited

U.S. PATENT DOCUMENTS

| | | | | | |
|---|---|---|---|---|---|
| 4,994,957 | A | * | 2/1991 | Komiya et al. | ................ 700/18 |
| 5,177,420 | A | * | 1/1993 | Wada et al. | ........... 318/568.11 |
| 5,210,859 | A | * | 5/1993 | Aoshima et al. | ............... 714/46 |
| 5,553,297 | A | * | 9/1996 | Yonezawa et al. | ............ 700/18 |
| 5,687,074 | A | * | 11/1997 | Tanaka et al. | ................. 700/26 |
| 5,699,080 | A | * | 12/1997 | Oshiga et al. | .............. 345/157 |

(Continued)

FOREIGN PATENT DOCUMENTS

JP    03-024639    2/1991

(Continued)

*Primary Examiner*—Crystal J. Barnes
(74) *Attorney, Agent, or Firm*—Beyer Weaver LLP (57) ABSTRACT

A development aid device for development of a ladder program such as a user program for a programmable controller has a program memory for storing the user program and an outline data generating part for sequentially scanning constituent elements of this stored user program to extract specified elements including output commands and generating outline data by assigning individual index numbers to these extracted elements sequentially in the order of their appearance on the user program. An outline data memory stores the generated outline data. A cross-reference data generating part generates cross-reference data by extracting commands having a same operand from the user program, and a cross-reference data memory stores the generated cross-reference data. A display device is provided with a user program display area for displaying the user program, an outline data display area for displaying the generated outline data in a tree form in the order of appearance, and a cross-reference data display area for displaying the cross-reference data.

16 Claims, 12 Drawing Sheets

U.S. PATENT DOCUMENTS

| | | | | |
|---|---|---|---|---|
| 5,784,621 A | * | 7/1998 | Onishi et al. | 717/109 |
| 5,905,891 A | * | 5/1999 | Harada et al. | 717/146 |
| 6,003,143 A | * | 12/1999 | Kim et al. | 714/38 |
| 6,427,232 B1 | * | 7/2002 | Ku et al. | 717/124 |
| 6,681,343 B1 | * | 1/2004 | Nakabo | 714/38 |
| 6,735,764 B2 | * | 5/2004 | Nakai | 717/156 |
| 6,823,497 B2 | * | 11/2004 | Schubert et al. | 716/4 |
| 2006/0179120 A1 | * | 8/2006 | Kegoya et al. | 709/217 |
| 2006/0259823 A1 | * | 11/2006 | Sohm et al. | 714/38 |

FOREIGN PATENT DOCUMENTS

| | | | | |
|---|---|---|---|---|
| JP | 06138913 A | * | 5/1994 | |
| JP | 06266420 A | * | 9/1994 | |
| JP | 10-293603 | | 11/1998 | |
| JP | 2002-041111 | | 2/2002 | |
| JP | 2002073120 A | * | 3/2002 | |
| JP | 2003044108 A | * | 2/2003 | |
| JP | 2003076405 A | * | 3/2003 | |
| JP | 2005-100068 | | 3/2005 | |
| JP | 2006146955 A | * | 6/2006 | |

* cited by examiner

| Index (Step) | : Command |
|---|---|
| 000000 (000000) | : LD a |
| 000001 (000001) | : OUT b ① |
| 000002 | : (*comment 1 *) [16#0001] ② |
| 000003 (000002) | : LD a |
| 000004 (000003) | : IL (002) ③ |
| 000005 (000004) | : LD b |
| 000006 (000005) | : OUT c ④ |
| 000007 (000006) | : LD dd |
| 000008 (000007) | : OUT y ⑤ |
| 000009 (000008) | : ILC (003) ⑥ |
| 00000A | : (* [parts1] ⑦ |
| parts1 test *) | [16#0000] |
| 00000B | : (*comment 2 *) [16#0002] ⑧ |
| 00000C (000009) | : LD A000.01 |
| 00000D (00000A) | : IL (002) ⑨ |
| 00000E (00000B) | : LD b1 |
| 00000F (00000C) | : OUT varbool ⑩ |
| 000010 (00000D) | : LD dd1 |
| 000011 (00000E) | : OUT varbool2 ⑪ |
| 000012 (00000F) | : ILC (003) ⑫ |
| 000013 | : PARTS_END |
| 000014 (000010) | : LD a |
| 000015 (000011) | : FB1 inst1 ⑬ |
| 000016 (000012) | : OUT b ⑭ |
| 000017 (000013) | : END (001) ⑮ |

Fig. 15

DEVELOPMENT AID DEVICE

This is a continuation-in-part of application Ser. No. 11/094,090 filed Mar. 29, 2005, currently pending.

BACKGROUND OF THE INVENTION

This invention relates to a development aid device for a ladder program such as, more specifically, a user program for a programmable controller.

A programmable controller (PLC), which is commonly being used as a control device for factory automation (FA), is typically formed as an appropriate combination of a plurality of units of various kinds such as a power unit for supplying electrical power, a CPU unit for controlling the whole PLC, an input unit for inputting signals from switches and sensors that are set at appropriate positions on a production apparatus or an equipment apparatus for the FA, an output unit for outputting control signals to actuators or the like, and a communication unit for connecting to a communication network.

The control by the CPU unit of a PLC is carried out by cyclically repeating the processes of taking in a signal inputted through the input unit to the I/O memory of the CPU unit (IN-refresh), carrying out a logical calculation based on a user program formed by a preliminarily registered ladder language (calculation execution), writing the results of the calculation execution into the I/O memory and transmitting them to the output unit (OUT-refresh), and thereafter carrying out the so-called peripheral processes.

In the above, the user program is usually a ladder program created by using a development aid device and is downloaded to the CPU unit of the PLC through a communication line. When a problem occurs in the created ladder (user) program, the user displays this ladder program on the display screen of the development aid device, finds the problem point and carries out a repair work. The repaired ladder program is downloaded to the PLC.

The work of debugging a ladder program is carried out by using as the key the operand (such as a contact number or a memory number) of the output command which operated abnormally and repeatedly correcting and editing the ladder program by detecting input commands or output commands related to that output command. The contact number means the terminal number that indicates the terminal position of the terminal block of the input unit or the output unit. The memory number means the address value of the IO data memory in the programmable controller. To a person who does the work of debugging, it is a cumbersome job to detect an input or output command that relates to the output command that has operated abnormally. For example, if there are a plurality of input commands that relate to the output command found to have a problem, all of these plurality of input commands must be checked and the process of finding them out is very troublesome. If there is a portion of the program that includes an input command having the same operand as the aforementioned output command, it is necessary, after correcting the program related to the problem output command, to ascertain that this program also functions normally. In other words, it is extremely troublesome to check all commands to be checked without missing a single one. The problem becomes severer as the ladder program becomes longer.

SUMMARY OF THE INVENTION

It is therefore an object of this invention to provide a development aid device capable of easily detecting constituent elements of a program including output commands that affect other commands, displaying the program that includes such constituent elements, extracting and displaying other constituent elements related to such constituent elements and easily carrying out a debugging work on a user program.

The development aid device according to this invention is adapted, for example, to carry out the editing of a ladder program (user program) to be downloaded to a programmable controller. Explained more in detail, it may be characterized as comprising a program memory for storing the user program, an outline data generating part for sequentially scanning constituent elements of the user program stored by the program memory to thereby extract specified elements including output commands and generating outline data by assigning individual index numbers to these extracted elements sequentially in the order of appearance on the user program, an outline data memory for storing the outline data, and a display device provided with a user program display area (ladder display area) for displaying the user program and an outline data display area for displaying the outline data in a tree form in the order of their appearance.

With a device thus structured, specified constituent elements inclusive of output commands are displayed in the outline data display area sequentially in the order of their appearance on the program and hence it is easy to ascertain where each specified element is with respect to the whole of the user program. Although step numbers are usually not assigned to comments, different index numbers are assigned according to this invention to all constituent elements of the user program inclusive of comments such that even if a comment is set as a specified constituent element, the index numbers can be used to establish correlation between the outline data display area and the ladder (user program) display area. In other words, if a specified constituent element displayed in the outline data display area is selected, the constituent element of the user program corresponding to the index number assigned to the selected constituent element is acknowledged and may be displayed in the ladder (user program) display area. The development aid device of this invention is also capable of generating such outline data automatically and having them registered.

It is preferable to further provide the development aid device of this invention with a cross-reference data generating part for generating cross-reference data by extracting commands having the same operand as a selected command from the user program displayed in the ladder (user program) display area. In this way, input commands to be affected by this output command can be displayed as a list.

It is further preferable to provide the function of referencing, when a specified command displayed in the cross-reference data display area is selected, a user program to which the selected command belongs and to display this selected command in the ladder (user program) display area. In this way, the actual user program corresponding to the command displayed in the cross-reference data display area can be displayed and it can be easily ascertained how this command affects the other circuits on the program.

It is further preferable if the development aid device is adapted to store data on one or more commands displayed in the cross-reference data display area and, after the display in the cross-reference data display area is changed, to display again the stored data in the cross-reference data display area. This corresponds to the so-called bookmark function.

In summary, specified constituent elements of a user program inclusive of output commands that affect the other commands in the program can be easily extracted and displayed in the outline display area. Moreover, if a cross-reference display area is provided, other commands having the same operand as such output command can be extracted and displayed. Thus, a command that becomes a problem can be searched for among many commands. When a program related to an output command that becomes a problem has been corrected, it can be ascertained accurately whether a portion of the program containing all commands having the same operand as this output command can operate normally.

DETAILED DESCRIPTION OF THE INVENTION

Figure 1:
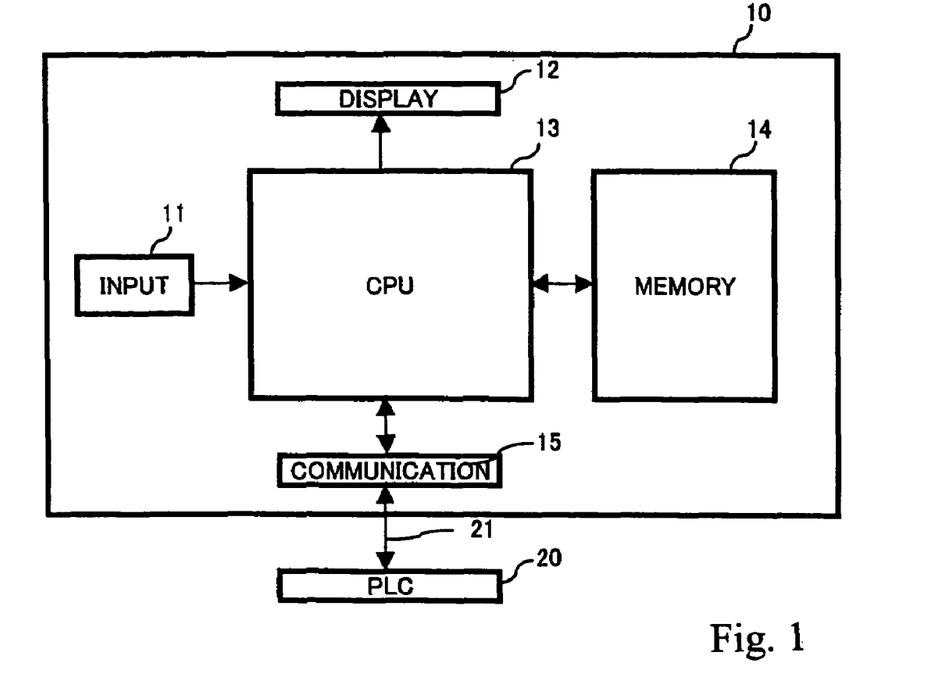
FIG. 1 is a hardware block diagram of an embodiment of this invention.

FIG. 1 shows a preferred embodiment of this invention with a development aid device 10 and a PLC (or its CPU unit) 20 connected through a communication line 21. This communication line 21 may be realized by using a serial line such as RS232C for a direct cable connection but a direct cable connection is not a requirement. The PLC 20 and the development aid device 10 may be connected by means of a communication line of a different type through a network.

Figure 4:
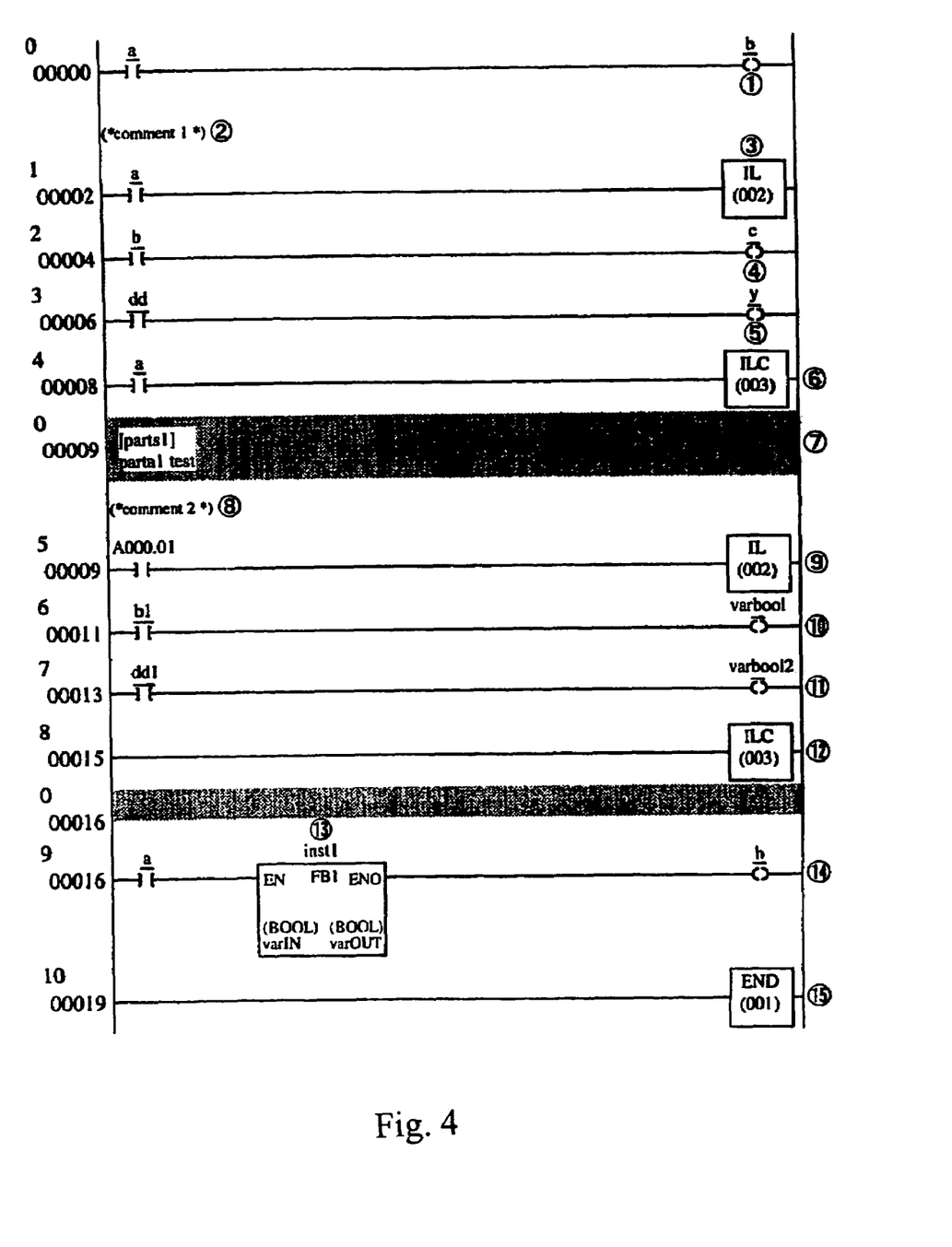
FIG. 4 is an example of ladder (user) program displayed in the ladder (user program) display area.

The development aid device 10 is provided with the functions of creating a user program to be executed by the programmable controller, downloading a created user program to the PLC 20 through the communication line 21, and setting parameters of various kinds related to the operations of the programmable controller. The user program is a program written in a ladder language as shown in FIG. 4. The development aid device 10 carries out its functions by activating software that is preliminarily installed in a personal computer, and its hardware construction includes an input device 11 such as a keyboard and a pointing device, a display device 12, a central processing unit 13, a memory device 14 and a communication unit 15. Although not illustrated, the memory device includes both volatile and non-volatile devices, and the ladder program and its outline data and cross-reference data are stored in the non-volatile memory device. The volatile memory device is used as a work memory when the central processing unit 13 is operated.

Figure 15:
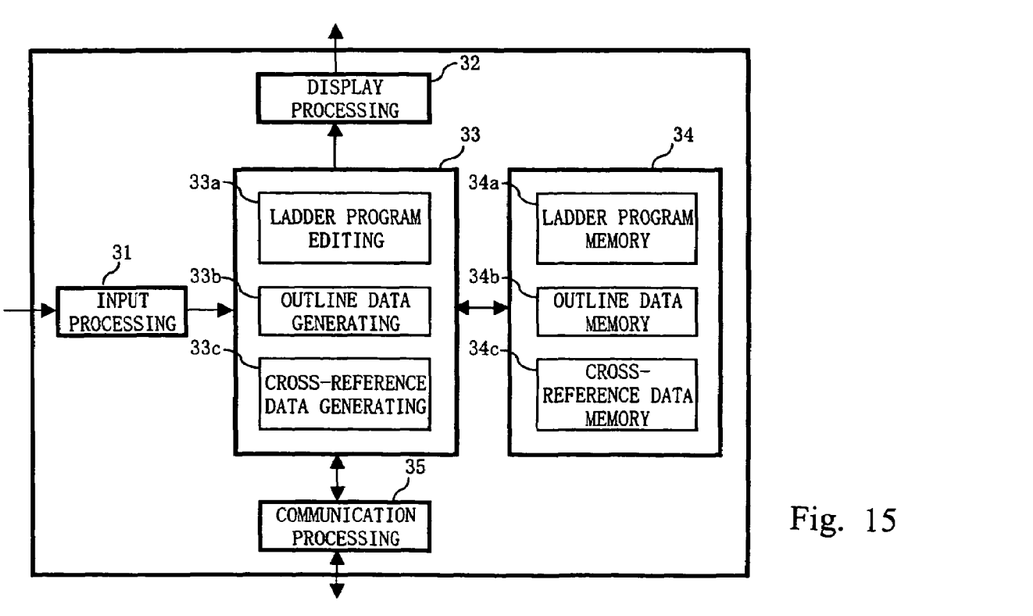
FIG. 15 is a functional block diagram of the development aid device.

FIG. 15 is a functional block diagram of the development aid device 10 using its central processing unit 13 and memory device 14 shown in FIG. 1. As shown, the development aid device 10 according to this invention includes an input processing part 31 for processing input data from the input device 11, a display processing part 32 for creating display data to be outputted to the display device 12, an execution part 33 for executing various functions, a memory part 34 for storing execution results, the ladder program, etc. and a communication processing part 35 for processing the communications with the PLC. The execution part 33 includes a user (ladder) program editing part ("ladder editor") 33a, an outline data generating part 33b and a cross-reference data generating part 33c. The memory part 34 includes a user program memory part 34a, an outline data memory 34b and a cross-reference data memory 34c.

Figure 2:
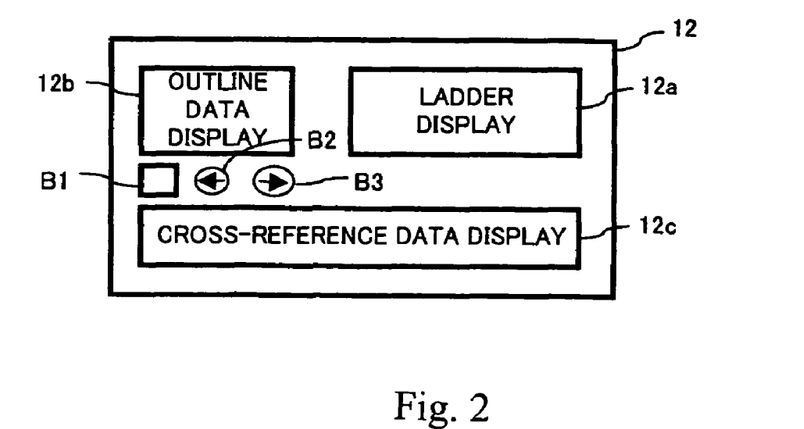
FIG. 2 shows an example of display on the display screen.

FIG. 2 shows an example of display on the display screen. As shown, the display screen is provided with a ladder display area 12a for displaying the ladder program, an outline data display area 12b for displaying outline data that show the structure of the ladder program and a cross-reference data display area 12c for displaying data on commands having the same operand as the operand of a specified command. As will be explained more in detail below with reference to FIGS. 8, 9, 12 and 13, variable names may be assigned according to this example corresponding to contact numbers and memory numbers corresponding to the operand of a command such that a program can be edited by using such variable names. Since programs can be edited by using variable names, operands can be displayed by variable names also in the ladder display area, the outline data display area and the cross-reference data display area. It goes without saying that displays may be made without using such variable names by using contact numbers and memory numbers.

Outline data to be displayed in the outline data display area 12b are created by the outline data generating part 33b and stored in the outline data memory 34b of the memory part 34. The display processing part 32 displays in the outline data display area 12b outline data on the ladder program displayed in the ladder display area 12a.

Figure 6:
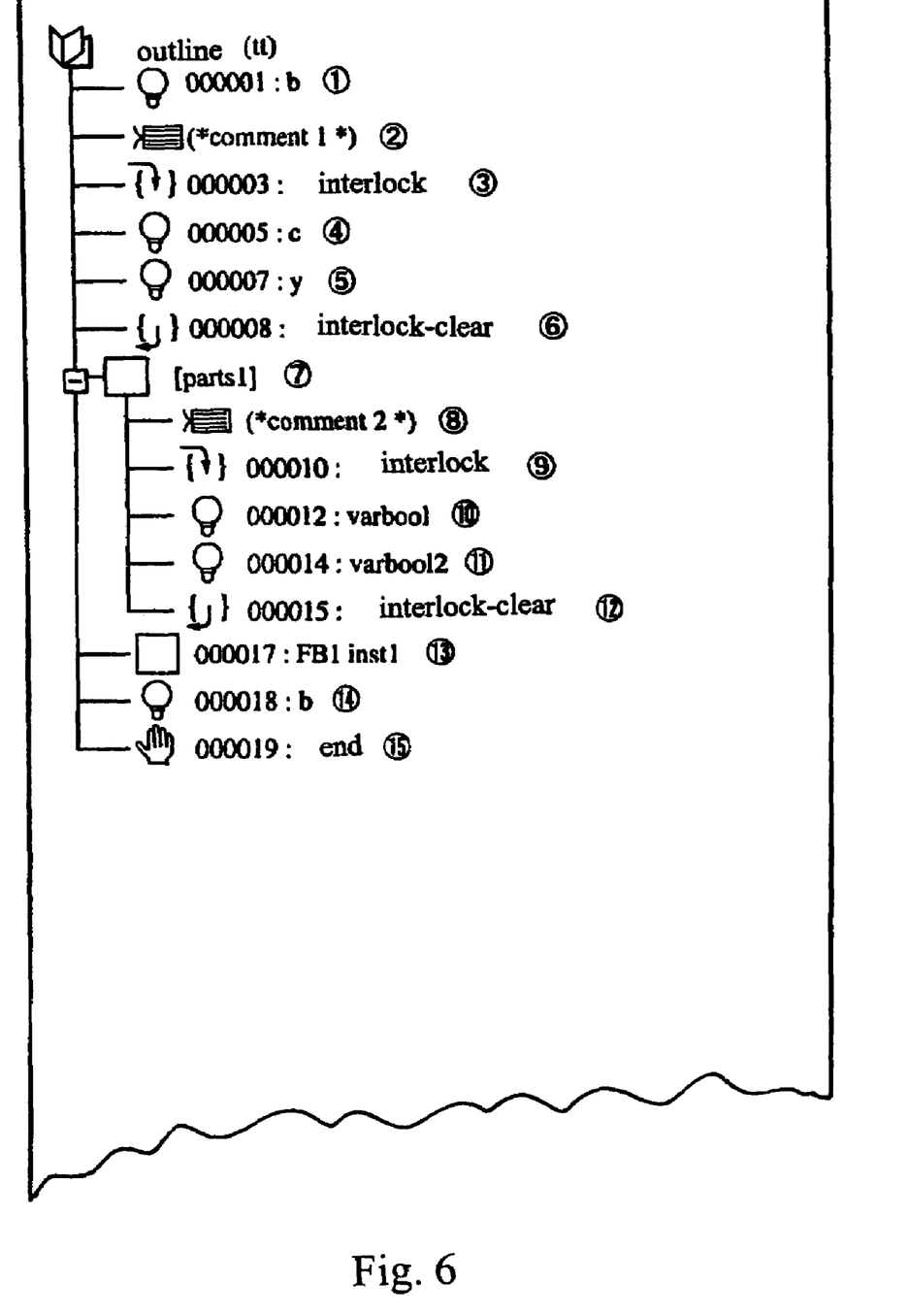
FIG. 6 shows an example of how the ladder (user) program shown in FIG. 4 may be displayed in the outline data display area.

The outline data are data that show an outline of the structure of the ladder program obtained by extracting specified elements used in the ladder program sequentially from its beginning. Outline data of the ladder program shown in FIG. 4 may be displayed for example as shown in FIG. 6. As shown, when outline data are displayed in the outline data display area 12b, specified elements of a ladder program are arranged sequentially in the order in which they appear, and a circuit part which is an assembly of a plurality of commands is displayed in a tree-form displaced to the right by one word position. The operator for debugging can easily ascertain by observing such outline data how each of the extracted elements is situated within the ladder program.

The elements of a ladder program to be displayed in the outline data display area are not fixed but are selectable. In the illustrated example, output commands, comments, function blocks (FB), interlock/interlock clear and beginnings and ends of circuit parts are selected. If only output commands are selected, as another example, only output commands in a ladder program are extracted and arranged sequentially in the order of appearance from the beginning.

Figure 3:
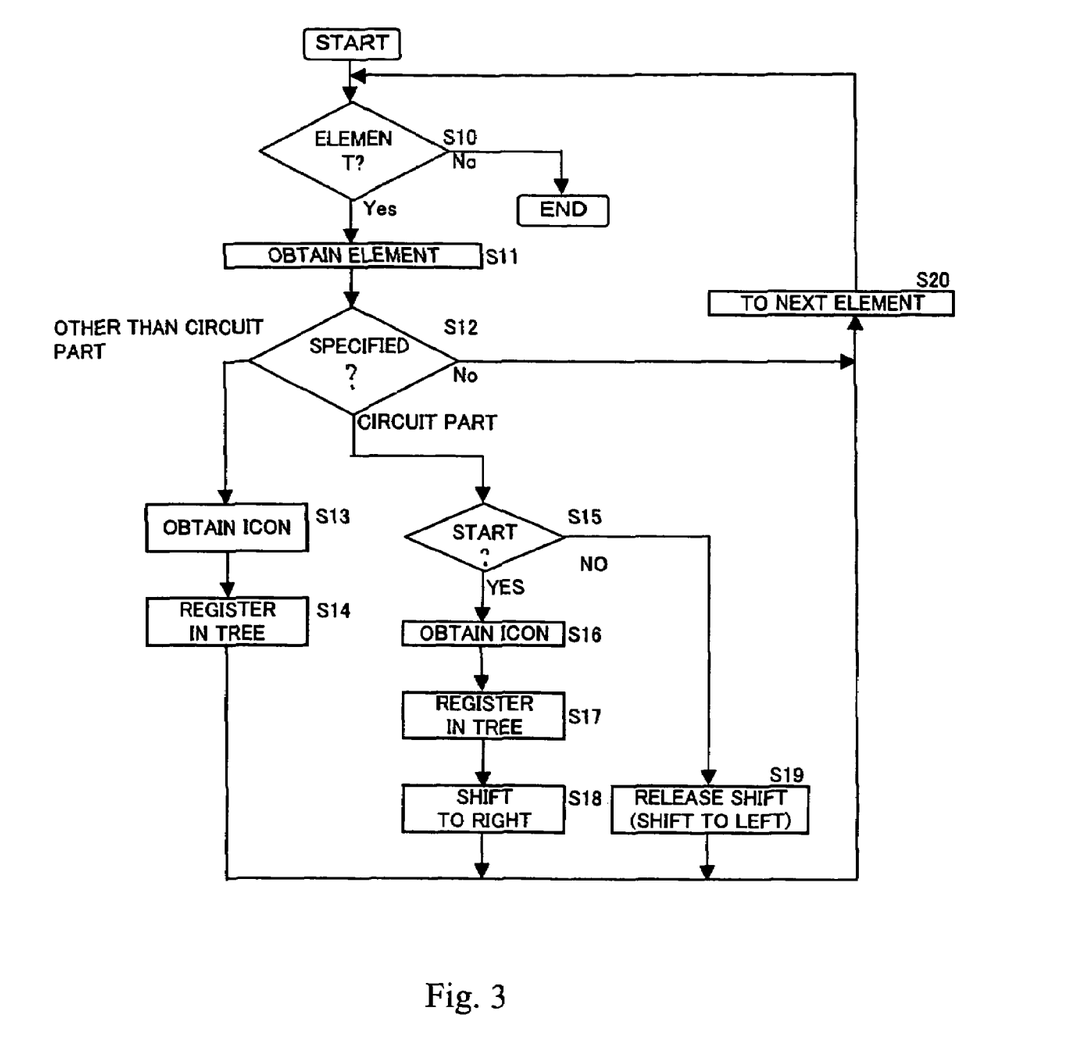
FIG. 3 is a flowchart of the operations by the outline data generating part.

As a command to create outline data is received, an outline data generating part 33b of the central processing unit 13 scans the object ladder program sequentially from its beginning, extracts constituent elements of the preliminarily selected kinds and registers them sequentially to create outline data having a hierarchical structure. FIG. 3 is a flowchart of the operations by the outline generating part 33b. A scan is made sequentially from the beginning of the program and if an element is encountered (YES in Step S10), the encountered element is obtained (Step S11). In this example, all encountered elements are taken in and determined whether they are of the kind to be extracted or not (Step S12). If the encountered element is not of the kind to be extracted (NO in Step S12), the scan is continued in search for the next element (Step S20). If there is no more element to be encountered (NO in Step S10), the routine is ended.

If the element taken in is of the specified kind (YES in Step 12), it is determined next whether it is a circuit part or not, and if it is other than a circuit part, the icon which corresponds to the element is obtained (Step S13) and is registered in a tree (Step S14). The corresponding icons are different for different kinds of elements. A table is preliminarily prepared, showing all the corresponding relationships between the kinds of elements and the icons, and is stored in the memory device 14. A mark in the form of a light bulb may be used for output commands and a mark in the form of a bookmark may be used for comments. The kind of each obtained command is thus recognized in Step S13 and the corresponding icon is obtained by referencing this table. Registration to a tree is made as an addition to the line below the current line.

Data to be registered to a tree include an icon, index numbers, step numbers and variable names. The index numbers are numbers that are unique on the ladder program and set in the ascending order not only on each command but also on comments without a step number. The user who debugs can identify any command or comment if its index number is specified in the ladder program.

If the obtained command is either the start or the end of a circuit part, it is determined whether it is the start or the end (Step S15) and if it is the start (YES in Step S15), the icon for the circuit part is obtained (Step S16) and is registered to a tree (Step S17). The process of Step S17 is similar to that of Step S14. Thereafter, the tree is shifted to the right by one step ("tree nest to right") (Step S18) and the process returns to Step 10 through Step S20. Thus, the registration of a tree for elements detected thereafter (by the process of Step S14) is added below this shifted tree such that it can be instantly understood that it is an element belonging to the circuit part.

If the obtained element (command) is the end of a circuit part (NO in Step S15), the shifting of the tree to the right is released (Step S19) and the process returns to Step S10 through Step S20. Thus, the elements (commands) that are detected thereafter are added to the tree before the shift to the right or on the step above.

Figure 5:
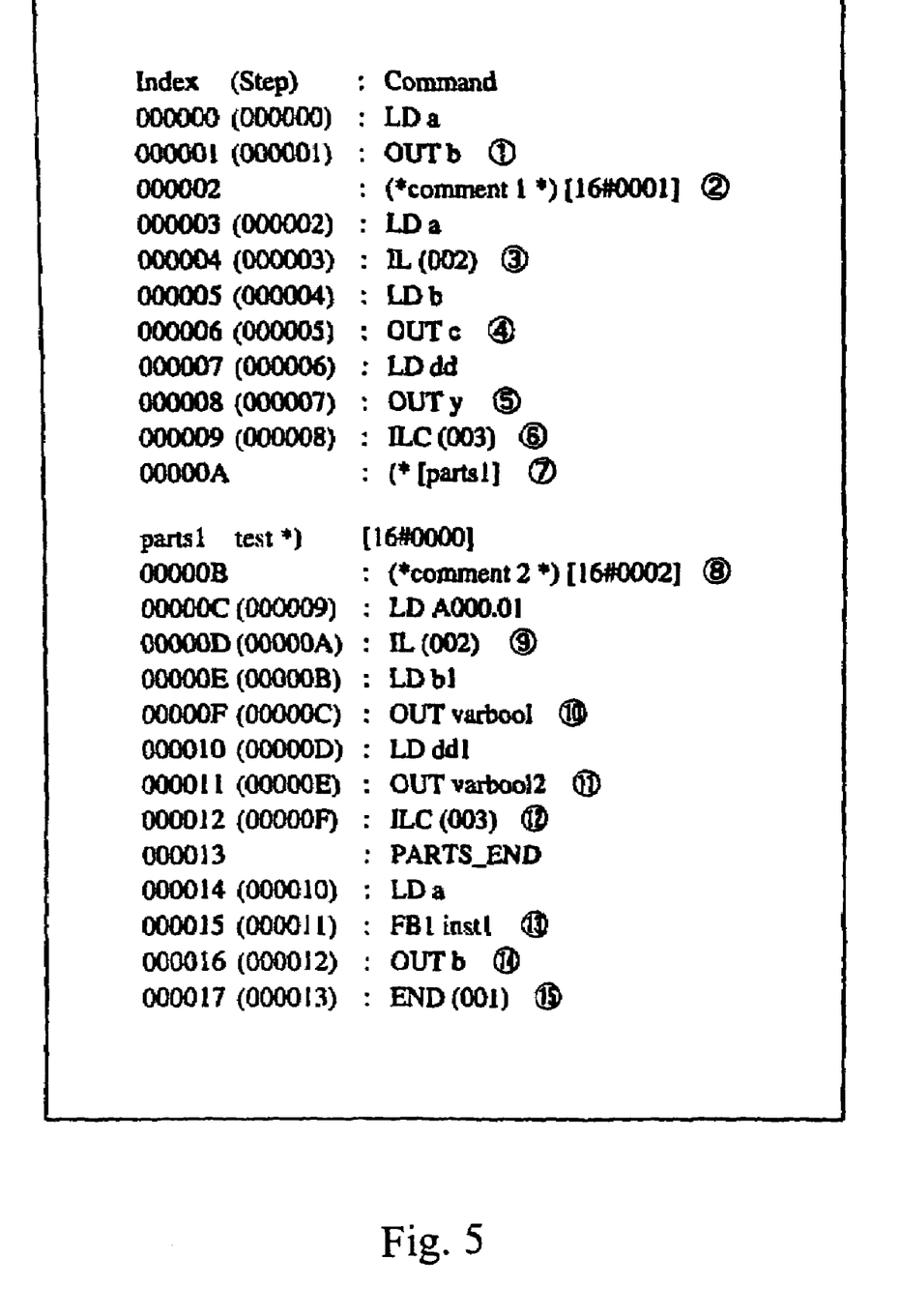
FIG. 5 shows a list of the program shown in FIG. 4.

Thus, elements of a program can be registered sequentially from the top of a tree in the order of their appearance in the program as they are scanned and processed sequentially from the top of the program. Next, this process will be explained by way of an example. If the ladder program is as shown in FIG. 4, the list of its constituent list may be as shown in FIG. 5, circled numerals indicating corresponding object elements. As shown in FIG. 5, the step numbers are numerals that indicate the order in which commands appear from the top, starting from zero and ascending thereafter. They are assigned to the commands but not to the comments. In the illustrated example, as shown in FIG. 5, index numbers are assigned to all elements inclusive of both commands and comments sequentially in the order of their appearance in the program. In FIG. 4, lines 9-15 indicate a single circuit part with part name "parts1".

Suppose the commands in the element list of FIG. 5 corresponding to the ladder program of FIG. 4 are processed sequentially from the top. Since the first element "Index000000" is an input command, the response in Step S12 in the flowchart of FIG. 3 is NO. Since the next element "Index000001" is an output command (OUT), the response in Step S12 is YES, and a corresponding icon (a light bulb mark) is obtained (Step S13) and registered to a tree (Step S14). Altogether, this results in the first line of FIG. 6 with an icon, a step number (000001) and a variable name (b). Since the next element with no step number ("Index000002") is a comment, the response in Step S12 is YES, and a corresponding icon (a bookmark) is obtained (Step S13) and registered to the tree (Step S14). This results in the second line of FIG. 6 with an icon and a comment without a step number.

Processing continues thereafter and when it comes to "Index00000A", Steps S15-S17 are carried out because it is the beginning of a circuit part and circuit name "parts1" is added to the seventh line as shown in FIG. 6. Since the tree is thereafter shifted to the right in Step S18, the comment "*comment2*" corresponding to the element that is detected next (Index00000B) is displayed at a shifted position when it is added to the eighth line. The subsequently detected elements are all displayed at this shifted position until "PARTS_END" of "Index000013" indicating the end of this circuit part is executed in Step S19 of FIG. 3 and the shifting to the right is thereby released.

After the shifting of the tree is released, the function block of Index000015 ("FB1inst1") is added to the thirteenth line of FIG. 6. Thereafter, as the processing of Step S14 is carried out on the END command of "Index000017" and the result is added to the tree, the process is completed because there is no more element to be encountered and the judgment result in Step S10 becomes NO.

The outline data thus created are stored in the outline data memory 34b. Thus, by taking a look at the outline data displayed in a tree-form in the outline data display area 12b, the user can immediately see output commands and comments that affect other commands arranged in the order of their appearance and can understand the approximate positions of each element within the program since circuit parts are shown shifted.

Next, the correlation between the ladder program displayed in the ladder display area 12a and the outline data in the tree form displayed in the outline data display area 12b is explained. If any constituent element is selected out of the outline data in the tree form displayed in the outline data display area 12b, the corresponding element of the corresponding ladder program is displayed. Explained more in detail, this correlation is carried out by the function of executing the process flowchart shown in FIG. 7.

Figure 7:
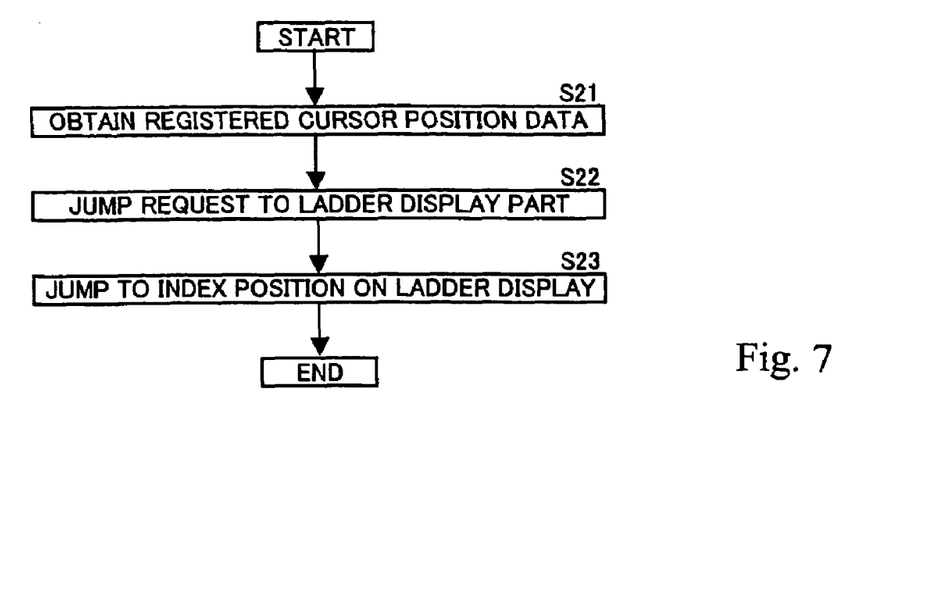
FIG. 7 shows an example of the jump function from the list displayed in the outline data display area to the ladder (user) program displayed in the ladder (user program) display area.

As the user operates the input device 11 such as a pointing device to select an element in the tree-formed list, the selected element is recognized and the outline data memory 34b is accessed to obtain the index number out of the outline data. In other words, the data registered at the position of the cursor in the outline data display part 12b are obtained (Step S21). Next, this index number is given to the display processing part 32 for displaying the ladder image currently displayed on the ladder display part 12a to thereby make a "jump request" (Step S22). As this index number is received, this is used as a key to access the ladder program memory 34a to recognize the corresponding element by jumping to the corresponding position in the ladder program (Step S23). If this element is currently displayed in the ladder display area 12a, the cursor is moved to the corresponding element. If it is not displayed in the ladder display area 12a, it is caused to be displayed in the ladder display area 12a and the cursor is moved to this element.

Figure 8:
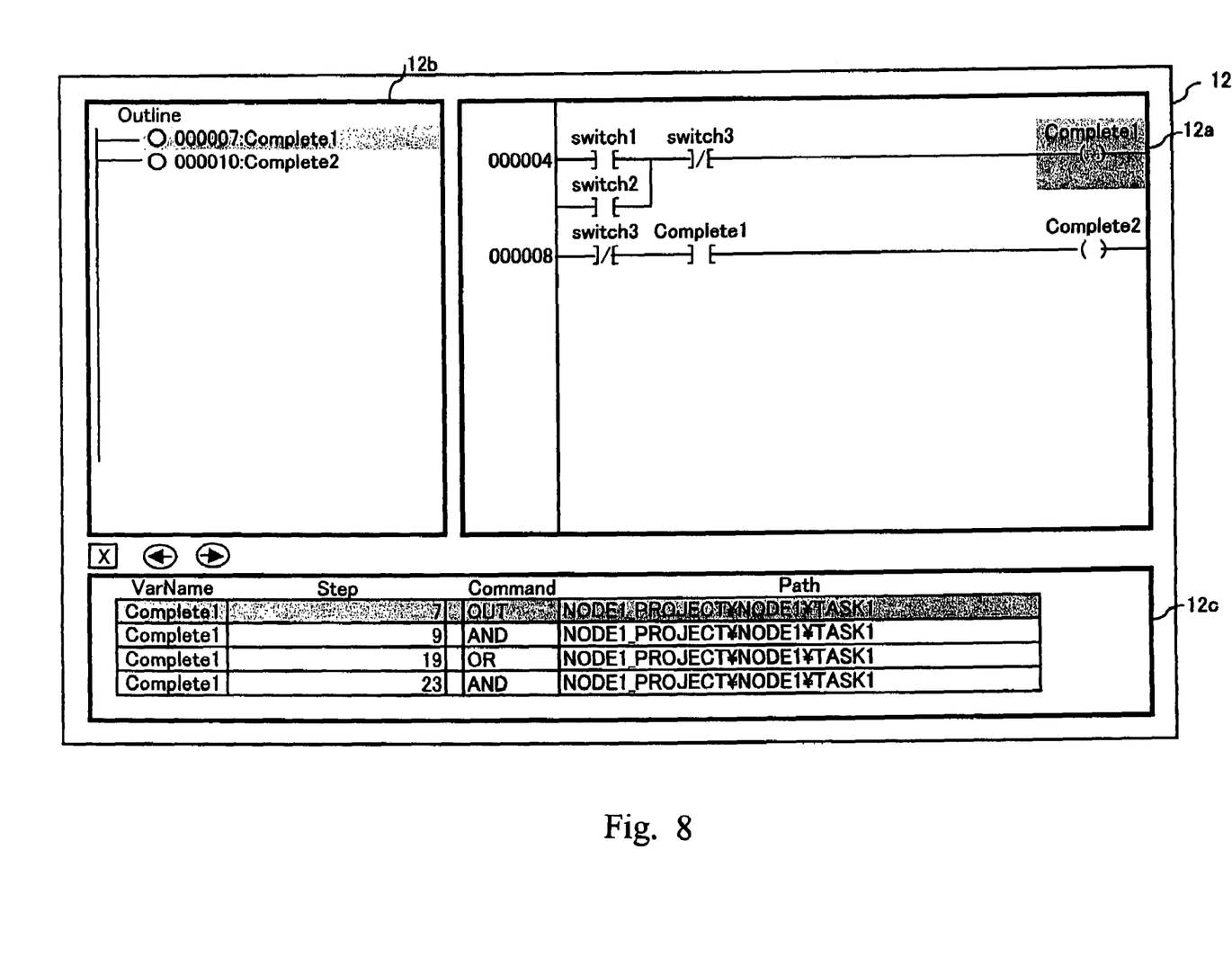
FIGS. 8 and 9 are examples of display for explaining effects of operations.
Figure 9:
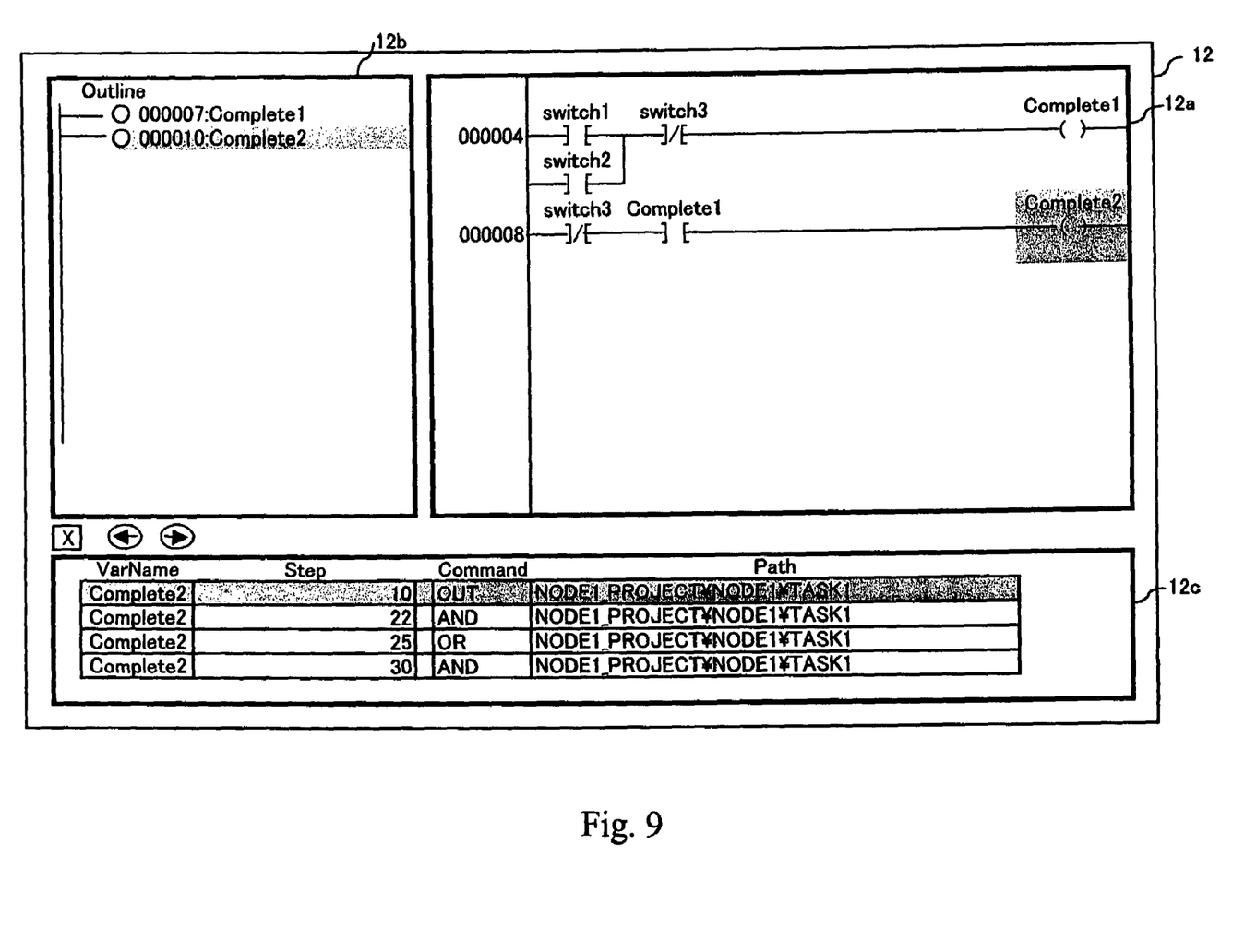

For example, as shown in FIG. 8, if "Step number: 00007, Variable name: Complete1" is selected from the tree in the outline data display part 12b, the cursor in the ladder display part 12a is on the corresponding output command "Variable name: Complete1". Under this condition, if "Step number: 00010, Variable name: Complete2" is selected in the tree of outline data display part 12b, the cursor in the ladder display part 12a moves to the corresponding output command "Variable name: Complete2", as shown in FIG. 9.

Next, cross-reference data to be displayed in the cross-reference data display area 12c will be explained. As a specified element in the ladder program displayed in the ladder display part 12a is selected, a constituent element having the same operand (variable name) as the selected element is extracted and displayed in the cross-reference data display area 12c. This process is carried out by the cross-reference data generating part 33c, which executes the flowchart shown in FIG. 11 based on data obtained by executing the flowchart of FIG. 10.

Figure 10:
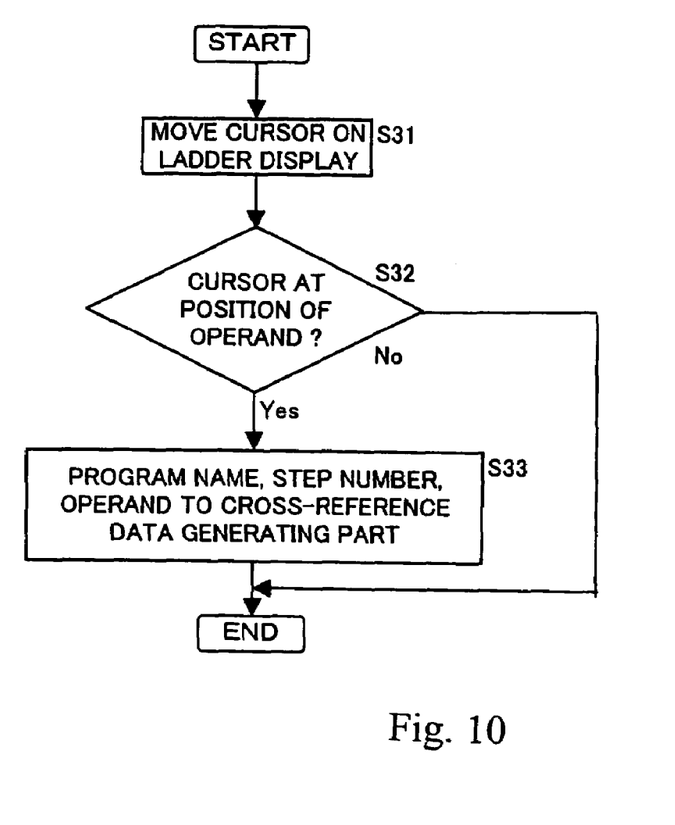
FIG. 10 is a flowchart of the operations by ladder editor.

The routine according to the flowchart of FIG. 10 starts by moving the cursor on the ladder screen displayed in the ladder display part 12a (Step S31) and it is checked whether the cursor is at the position of an operand or not (Step S32). If it is at the position of an operand (YES in Step S32), the program name, the step number and the operand (variable name) of the element at the position of the cursor are transferred to the cross-reference data generating part 33c (Step S33).

Figure 11:
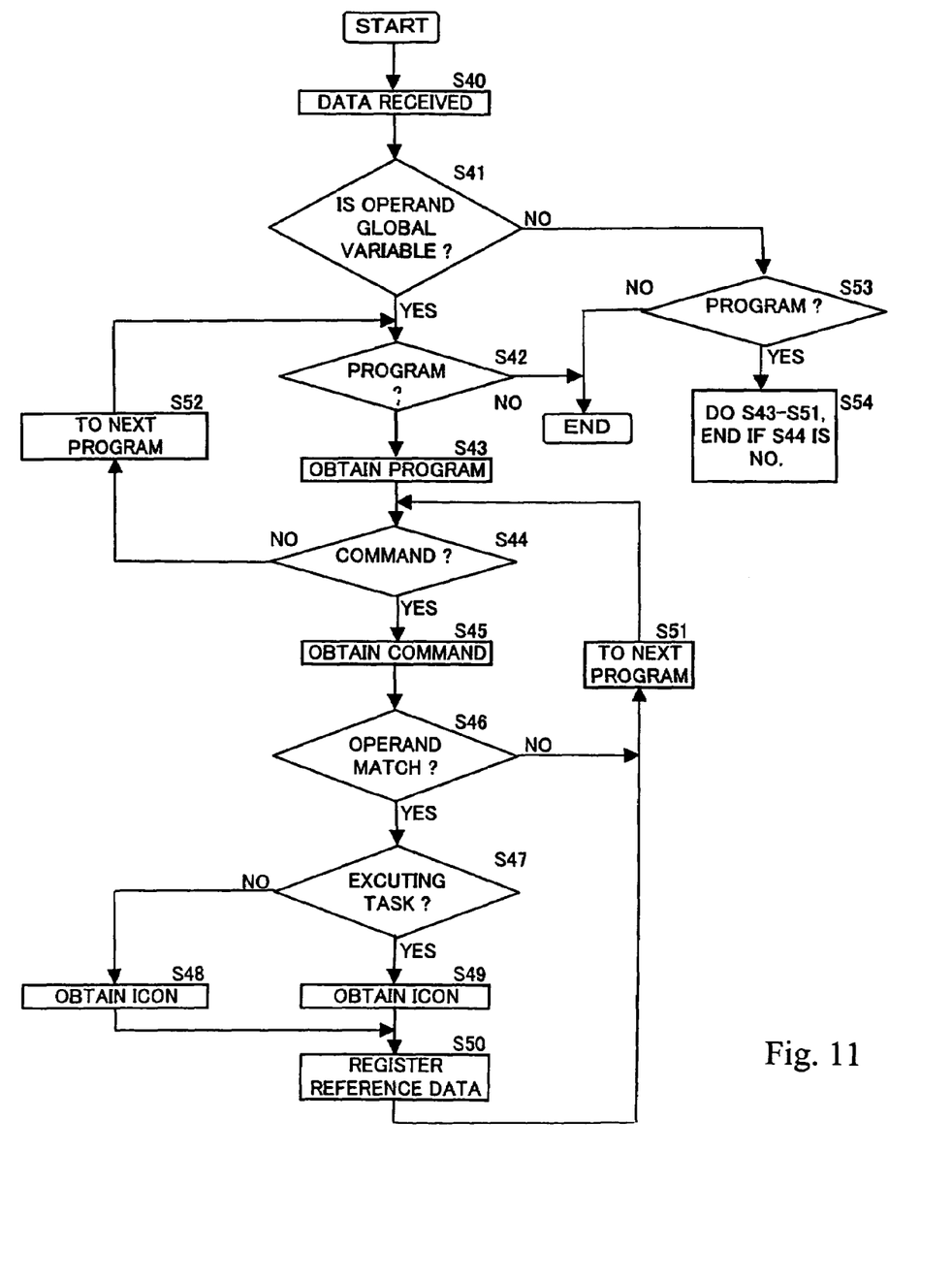
FIG. 11 is a flowchart of the operations by the cross-reference data generating part.

As the specified data are received from the ladder program editing part 33a (Step S40), it is determined whether the operand (variable name) is a global variable (used in common by a plurality of PLCs) or not (Step S41). This determination is made from the path attached in front of the operand (variable name). For example, the path of a global variable takes the form of "project name ¥ configuration name ¥ variable name" while that for a local variable (a task) used only by a specified PLC may be in the form of "project name ¥ configuration name ¥ task name ¥ variable name". Thus, a distinction can be easily made between a global variable and a local variable from the difference in the path.

In the case of a global variable (YES in Step S41), it is determined whether there is a program specified by the path (Step S42). The routine ends if there is no program. If there is a program, that program is obtained (Step S43), and it is scanned sequentially from the top. If a command is detected (YES in Step S44), the detected command is obtained (Step S45) and it is determined whether the operand (variable name) of that command matches the operand (variable name) obtained from the ladder editor (Step S46). If they match (YES in Step S46), it is determined whether or not this program is executing a task (Step S47) and an icon according to the presence or absence of execution is obtained (Step S48 or S49). Cross-reference data related to this command, inclusive at least of the operand (variable name), the address, the language, the path, the task execution status and the step number, are thereafter registered (Step S50).

After this registration, or after the operands are found not to match (NO in Step S46), the next commend is considered (Step S51). After all commands have been processed (NO in Step S44), the next program is considered (Step S52). After all programs have been processed (NO in Step S42), the series of processes is completed.

If the variable is not a global variable (NO in Step S41), it is determined whether or not there is a program specified by the path (Step S53). The process ends if there is no program (NO in Step S53). If there is, the processes from Step S43 to Step S51 are carried out (Step S54). Commands in the program with a matching operand (variable name) are obtained and registered together with related data (icons and cross-reference data). Step S54 is continued until the program is scanned to the end (NO in Step S44).

Figure 12:
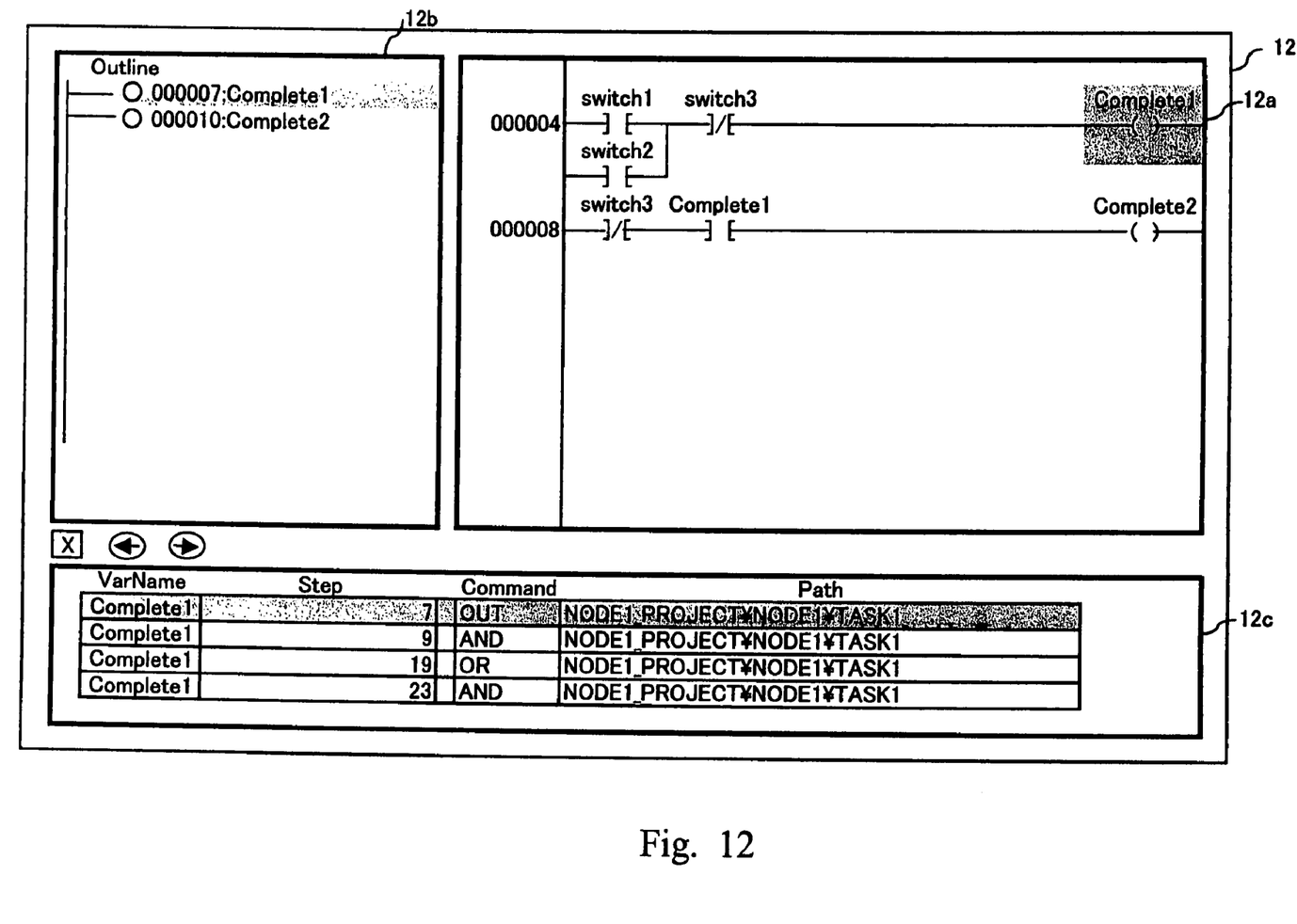
FIGS. 12 and 13 are examples of display for explaining effects of operations.

These cross-references, etc. are not only stored in a temporary file within the memory device 14 but also displayed in the cross-reference data display part as shown, for example, in FIG. 12. FIG. 12 shows an example wherein an output command with variable name "Complete1" in the ladder screen displayed in the ladder display area has been selected and hence four commands have been extracted and displayed as input commands having the same variable name.

Figure 13:
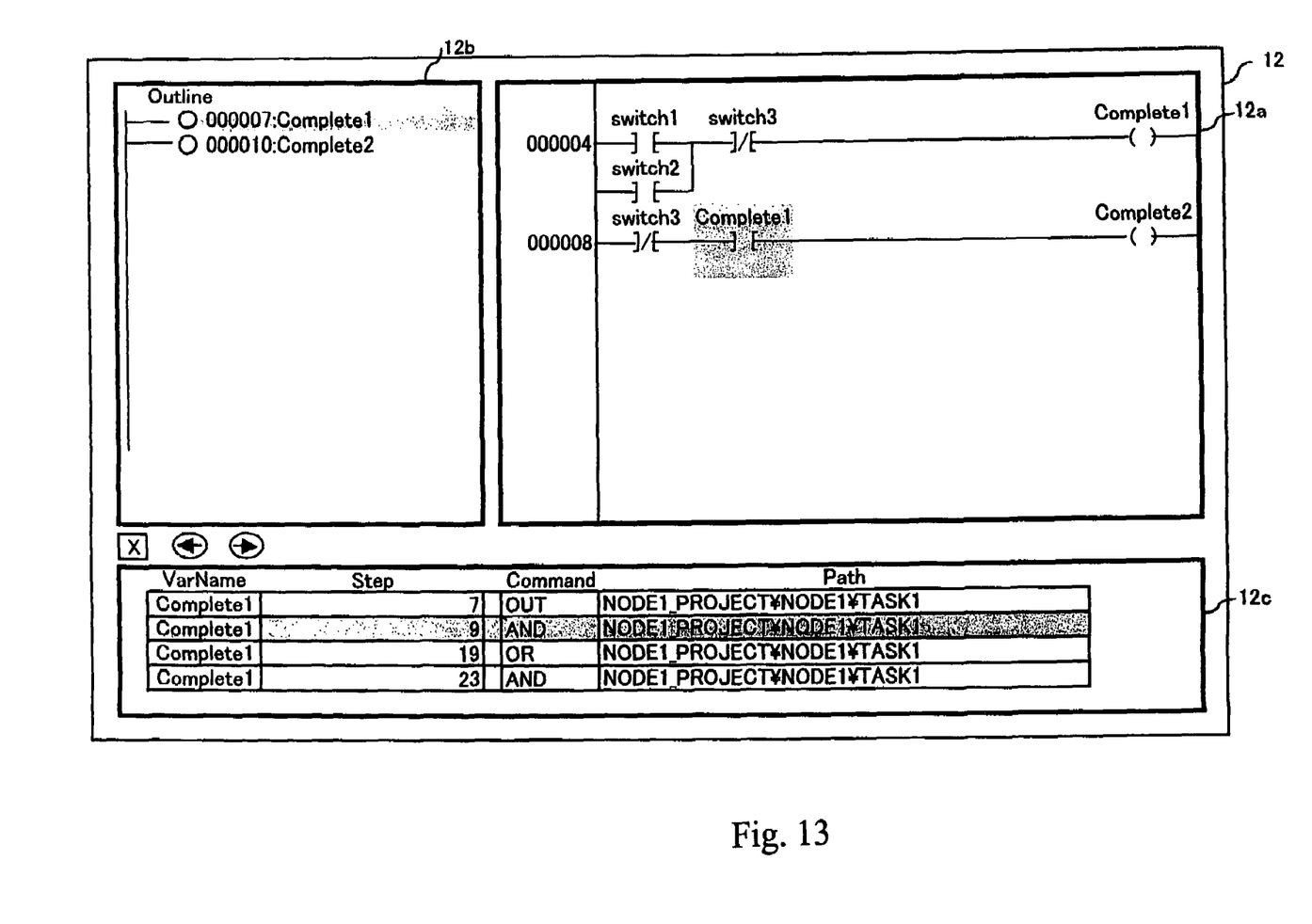

Under this condition, if one of the variable names displayed in the cross-reference data display area 12c (for example, the second one as shown in FIG. 13) is arbitrarily selected, the program containing the corresponding variable name (command) is displayed in the ladder display area 12a. The cursor may be applied in this case for emphasis to make it easier for the user.

Figure 14:
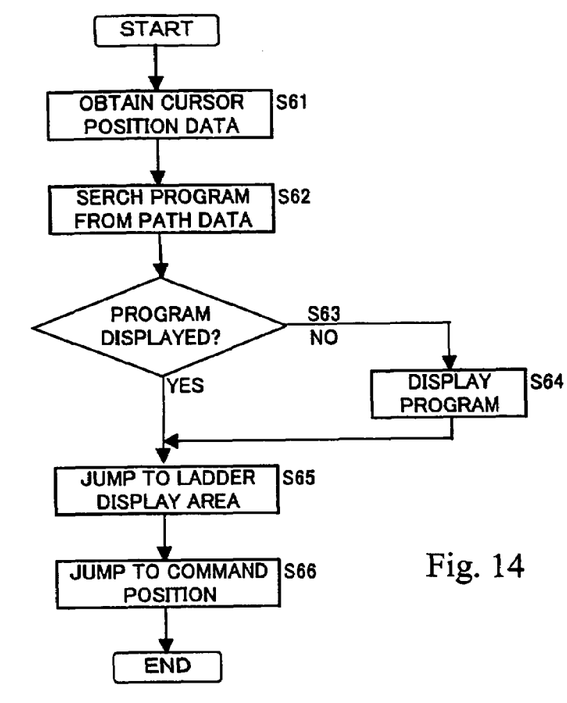
FIG. 14 is a flowchart of jump operation from a command displayed in the cross-reference data display area to a ladder (user) program displayed in the ladder (user program) display area.

FIG. 14 is a flowchart of the operations for carrying out this process. To start, data on the selected cursor position are obtained in the cross-reference data display area 12c (Step S61). For the path data of the variable name selected by the cursor, the program to which this variable name belongs is searched (Step S62) to determine whether or not a program is displayed in the ladder display area 12a (Step S63). If there is no program displayed (NO in Step S63), the program searched in Step S62 is displayed (Step S64).

Next, a jump is made to the corresponding program displayed in the ladder display area 12a (Step S65) and to the corresponding command position in the program (Step S66). The process of Step S66 is similar to that of Step S23 in FIG. 7. Thus, not only is the corresponding command displayed in the ladder display area 12a but also the cursor is moved and the display is emphasized.

The data displayed in the cross-reference data display area 12c are created by the cross-reference data generating part 33c and displayed every time corresponding to the selected element (command) in the ladder program displayed in the ladder display area 12a. Thus, whenever an element, which is not currently displayed in the cross-reference data display area 12c, is selected from the ladder display area 12a, the cross-reference data displayed in the cross-reference data display area 12c change accordingly. In such a situation, the user cannot easily return to the data that were being displayed immediately previously. In an actual debugging operation, there frequently occurs a desire (requirement) to return to a display made immediately before or several times earlier. In the past, such a desire (requirement) could not be satisfied.

In view of this problem, the display device 12 according to this invention, as shown in FIG. 2, is provided with a bookmark button B1, a return button B2 and an advance button B3. If the bookmark button B1 is clicked, the cross-reference data that are currently displayed come to be stored in the memory device 14 with a number assigned thereto in the order of being stored. Thus, whenever the return button B2 is clicked, the display device 12 references the assigned numbers and the cross-reference data which were displayed and came to be stored most recently are retrieved from the memory device 14 and displayed. If the advance button B3 is clicked, the display device 12 references the assigned numbers and retrieves the cross-reference data that came to be stored next after the cross-reference data that are currently displayed.

Thus, since the history of display of cross-reference data can be sequentially displayed and the user can easily review any of the cross-reference data, the debugging of the ladder program can be carried out much more easily.

What is claimed is:

1. A development aid device for a user program for a programmable controller, said development aid device comprising:
    a program memory for storing said user program;
    an outline data generating part for sequentially scanning constituent elements of said user program stored by said program memory, thereby extracting elements including output commands and generating outline data by registering said extracted elements sequentially in the order of appearance on said user program;
    an outline data memory for storing said outline data; and
    a display device provided with a user program display area for displaying said user program and an outline data display area for displaying said output commands in said outline data display area in the order of appearance based on said outline data.

2. The development aid device of claim 1 wherein said constituent elements include preliminarily selected elements and said outline data generating part extracts only the preliminarily selected ones of said elements including output commands and generates said outline data by registering only said extracted ones of the preliminarily selected constituent elements in the order of appearance on said user program.

3. The development aid device of claim 1 having correlating function for displaying corresponding positions of selected ones of output commands of the user program displayed in said user program display area, said selected ones of output commands being displayed in said outline data display area.

4. The development aid device of claim 3 wherein said correlating function serves, if a portion of said user program displayed in said user program display area is updated, to display the updated portion reflected in said outline data display area.

5. The development aid device of claim 3 further comprising:
    a cross-reference data generating part for generating cross-reference data, if said constituent elements of said user program displayed in said user program display area include preliminarily selected output commands, by extracting commands having same operand as the extracted ones of the preliminarily selected output commands from said user program; and
    a cross-reference data memory for storing said cross-reference data;
    said display device being provided further with a cross-reference data display area, said development aid device being adapted to display said cross-reference data in said cross-reference display area.

6. The development aid device of claim 5 that serves to use variable names to carry out programming of a user program for a target programmable controller being developed; wherein
    said operand is a variable name used for said programming;
    said cross-reference data display area serves to display constituent elements inclusive of input commands having the same operand as said output command and the variable names; and
    the development aid device is adapted, if any of the variable names displayed in said cross-reference data display area is selected, to display a portion of said user program including a corresponding variable name in said user program display area.

7. A development aid device for a user program for a programmable controller, said development aid device comprising:
    a program memory for storing said user program;
    an outline data generating part for sequentially scanning said user program stored by said program memory from the beginning, thereby extracting elements and generating outline data by assigning individual index numbers to said extracted elements in the order of appearance on said user program;
    an outline data memory for storing said outline data; and
    a display device having a user program display part for displaying said user program and an outline data display part for displaying said extracted elements together with said index numbers in said order of appearance based on said outline data.

8. The development aid device of claim 7 adapted to program said user program by writing comments in said user program;
    wherein said constituent elements include comments that do not have any index number assigned and are selected as objects of extraction;
    wherein said outline data generating part extracts those of said constituent elements, inclusive of said comments, that are selected as said objects of extraction, and generates said outline data by registering said extracted elements in the order of appearance on said user program.

9. A method of controlling a development aid device which stores in a program memory a user program including output commands and constituent elements other than said output commands and displays said user program on a display device, said method comprising the steps of:
    scanning constituent elements of said user program stored in said program memory sequentially from a start;
    extracting constituent elements including said output commands;
    generating outline data by registering the extracted structural elements including said output commands in the order of appearance on said user program; and
    displaying on said display device the extracted constituent elements including said output commands in the order of appearance on said user program based on said generated outline data.

10. The method of claim 9 wherein said extracted, registered and displayed constituent elements include only said output commands.

11. The method of claim 10 wherein said user program is a combination of output commands and input command using operands;
- wherein cross-reference data are generated by extracting constituent elements of the input commands having the same operands as the constituent elements of the output commands in the user program displayed on the display device by scanning the constituent elements of the user program stored in said program memory sequentially from the start; and
- wherein the constituent elements of the input commands having the same operand as the output commands are displayed on said display device based on said generated cross-reference data.

12. The method of claim 10 wherein said display device displays a portion of said constituent elements of the output commands of the outline data displayed on said display device corresponding to a specified portion of said output commands.

13. The method of claim 12 wherein said user program is a combination of output commands and input command using operands;
- wherein cross-reference data are generated by extracting constituent elements of the input commands having the same operands as the constituent elements of the output commands in the user program displayed on the display device by scanning the constituent elements of the user program stored in said program memory sequentially from the start; and
- wherein the constituent elements of the input commands having the same operand as the output commands are displayed on said display device based on said generated cross-reference data.

14. The method of claim 9 wherein said display device displays a portion of said constituent elements of the output commands of the outline data displayed on said display device corresponding to a specified portion of said output commands.

15. The method of claim 14 wherein said user program is a combination of output commands and input command using operands;
- wherein cross-reference data are generated by extracting constituent elements of the input commands having the same operands as the constituent elements of the output commands in the user program displayed on the display device by scanning the constituent elements of the user program stored in said program memory sequentially from the start; and
- wherein the constituent elements of the input commands having the same operand as the output commands are displayed on said display device based on said generated cross-reference data.

16. The method of claim 9 wherein said user program is a combination of output commands and input command using operands;
- wherein cross-reference data are generated by extracting constituent elements of the input commands having the same operands as the constituent elements of the output commands in the user program displayed on the display device by scanning the constituent elements of the user program stored in said program memory sequentially from the start; and
- wherein the constituent elements of the input commands having the same operand as the output commands are displayed on said display device based on said generated cross-reference data.

* * * * *